United States Patent
Malnati et al.

(10) Patent No.: US 9,268,007 B2
(45) Date of Patent: Feb. 23, 2016

(54) MOBILE COMMUNICATION AND LOCALIZATION DEVICE

(75) Inventors: Giovanni Malnati, Turin (IT); Gianfranco Caputo, Turin (IT); Claudia Barberis, Chivasso (IT); Paola Ruo Rui, Antibes (FR)

(73) Assignee: Sisvel Technology S.R.L., Turin (IT)

( * ) Notice: Subject to any disclaimer, the term of this patent is extended or adjusted under 35 U.S.C. 154(b) by 430 days.

(21) Appl. No.: 12/997,572

(22) PCT Filed: Jun. 12, 2009

(86) PCT No.: PCT/IB2009/005939
§ 371 (c)(1),
(2), (4) Date: Feb. 17, 2011

(87) PCT Pub. No.: WO2009/150527
PCT Pub. Date: Dec. 17, 2009

(65) Prior Publication Data
US 2011/0134781 A1   Jun. 9, 2011

(30) Foreign Application Priority Data
Jun. 12, 2008  (IT) .............. TO2008A0458

(51) Int. Cl.
*H04W 40/00* (2009.01)
*H04W 24/00* (2009.01)
(Continued)

(52) U.S. Cl.
CPC .............. *G01S 5/0072* (2013.01); *G01S 5/0289* (2013.01); *G01S 11/06* (2013.01); *H04W 64/00* (2013.01)

(58) Field of Classification Search
CPC .............. G01S 5/0072; G01S 5/0289
USPC .......................................... 370/252
See application file for complete search history.

(56) References Cited

U.S. PATENT DOCUMENTS

2003/0199269 A1* 10/2003 Tobe et al. ............ 455/422.1
2006/0112396 A1*  5/2006 Reich et al. ............ 719/313
(Continued)

FOREIGN PATENT DOCUMENTS

JP   2005-229173   8/2005
JP   2006-237666   9/2006
(Continued)

OTHER PUBLICATIONS

Jisun An et al., *Social-Relation Aware Routing Protocol in Mobile Ad hoc Network*, May 25, 2008, pp. 1-3, XP002551085.
(Continued)

*Primary Examiner* — Donald Mills
*Assistant Examiner* — Henry Baron
(74) *Attorney, Agent, or Firm* — Workman Nydegger

(57) ABSTRACT

A mobile communication and localization device cooperating with a plurality of mobile network devices includes a processing unit; a data structure containing a plurality of entries, each entry containing information about a corresponding mobile network device and a corresponding time stamp; a unit for sending data packets at respective transmission instants, each data packet containing position data indicating the position of corresponding mobile network devices; a unit for receiving data packets sent by sender mobile devices belonging to the plurality of mobile network devices; and a unit for determining the relative position of corresponding mobile network devices based on position data contained in the data packets.

11 Claims, 4 Drawing Sheets

(51) Int. Cl.
*G01S 5/00* (2006.01)
*G01S 5/02* (2010.01)
*G01S 11/06* (2006.01)
*H04W 64/00* (2009.01)

(56) References Cited

U.S. PATENT DOCUMENTS

2006/0149475 A1    7/2006   Kellum et al.
2006/0234758 A1*  10/2006   Parupudi et al. ............ 455/550.1
2009/0085806 A1*   4/2009   Piersol et al. ................ 342/386
2009/0289763 A1*  11/2009   Chriss et al. .................. 340/7.5
2014/0241189 A1*   8/2014   Larsen .......................... 370/252

FOREIGN PATENT DOCUMENTS

JP     2008-118484         5/2008
WO     WO 2008/066928      7/2006
WO     2007-031844 A2      3/2007

OTHER PUBLICATIONS

Jisun an et al., *Social-Relation Aware Routing Protocol in Mobile Ad hoc Network*, Apr. 18, 2008, pp. 1-4, XP002551086.
PCT/IB2009/005939, Dec. 6, 2009 International Search Report.
PCT/IB2009/005939, Oct. 28, 2009, Written Opinion.

* cited by examiner

| MOBILE DEVICE [ID] | CATEGORY | ABSOLUTE POSITION | ESTIMATED DISTANCE / SHORTEST PATH LENGTH | TIME STAMP | ALARM ? |
|---|---|---|---|---|---|
| 20 | 1 | / | 20 m | 10 : 00 : 00 | N |
| 30 | 1 | 45° 56' 35" NORTH 12° 27' 16" EAST | 100 m | 10 : 00 : 10 | S |
| 40 | 2 | / | 1 | 9 : 59 : 00 | N |
| 50 | 2 | / | 1 | 9 : 55 : 00 | N |
| 60 | 2 | / | 2 | 9 : 54 : 59 | N |
| 70 | 3 | / | / | 9 : 10 : 00 | N |
| 80 | 3 | 45° 56' 50" NORTH 12° 27' 55" EAST | / | 9 : 30 : 00 | S |

Fig.3

MOBILE COMMUNICATION AND LOCALIZATION DEVICE

FIELD OF THE INVENTION

The present invention relates to a mobile communication and localization device.

BACKGROUND AND SUMMARY OF INVENTION

As known, many private telecommunications systems are currently available which are generally referred to as Professional Mobile Radio (PMR) systems, i.e. mobile radio systems for professional users, such as police corps, building staff, rescue services, etc.

Current PMR systems typically comprise one or more repeaters (base stations) and a plurality of mobile devices, also referred to as mobile terminals, which can communicate with one another and with the base stations within the VHF (Very High Frequency) or UHF (Ultra High Frequency) bands.

As far as performance is concerned, the PMR systems currently in use allow their users, equipped with respective mobile devices, to communicate with one another even when they are many kilometers apart, i.e. they allow to obtain wide coverage areas.

Communication takes place when the mobile devices gain access to a radio channel shared by the mobile devices themselves. For security reasons, this access is granted to enabled mobile devices only, so that closed groups of users of corresponding PMR systems are formed; the management of said groups, i.e. the administration of user permissions, may also take place dynamically.

Unlike cellular networks, wherein communications are of the point-to-point type, i.e. the data is sent by a first mobile device and received by a second mobile device only, in PMR systems communications are generally of the point-multipoint type, i.e. the data is sent by a first mobile device and received by all other mobile devices belonging to the same group. Moreover, communications are typically of the "push to talk, release to listen" (PTT) type, i.e. a mobile device gains access to the radio channel when the user presses a push-button available on the mobile device itself.

Within the frame of the above-mentioned PMR systems, communications among different mobile devices occur in compliance with communication standards such as, for example, the Terrestrial Trunked Radio (TETRA) standard, the Project 25 standard and the MPT1327 standard (first generation trunked radio standard).

The TETRA standard requires a network infrastructure, also known as Switching and Management Infrastructure (SwMI), comprising a network of base stations (BS) and configured for arbitrating the communications among the various mobile devices by allocating corresponding radio resources.

According to the TETRA standard, different radio interface types, i.e. different communication modes (protocols), may be used, among which: a direct mode (Direct Mode Operation, DMO), wherein mobile devices establish communications directly between each other; an infrastructural or trunked mode (Trunked Mode Operation, TMO), wherein mobile devices communicate exclusively through the network infrastructure SwMI; a repeater mode, wherein a mobile device acts as a repeater of signals emitted by mobile devices operating in DMO mode, thus widening the network coverage; and a gateway mode (Gateway Mode Operation, GMO), wherein a mobile device acts as an intermediary between a group of mobile devices operating in DMO mode and a group of mobile devices operating in TMO mode. There are also TETRA radio interfaces optimized for voice and data traffic (voice plus data, V+D) and for data packet traffic (packet data optimized, PDO); in particular, in the case of a mobile device implementing a V+D radio interface, the mobile device will operate in "trunking" mode, i.e. it will use and release the radio channel in a dynamical manner, thereby allowing the radio channel to be effectively shared by different user groups.

Thanks to the presence of a network infrastructure, PMR systems compliant with the TETRA standard typically offer the following services to their users: group voice calls in half-duplex and PTT mode, emergency calls, dynamic group management, hierarchical communication management by means of priority mechanisms, and digital data transmission, though at low bit rates. In particular, the TETRA standard allows compliant mobile devices to operate as cellular telephones, i.e. terminals connected to the Public Switched Telephone Network (PSTN) through the SwMI network infrastructure, as well as to make group calls through the election of a "dispatcher", i.e. a mobile device adapted to distribute the signals emitted by the single mobile devices to other mobile devices belonging to the same group.

The Project 25 communication standard, commonly used in North America, is similar to the TETRA standard and comprises eight different communication interfaces. Mobile devices compliant with the Project 25 standard can communicate with traditional radio equipment in analog mode and with one another both digitally and analogically. In particular, communications among mobile devices take place by default through the mediation of a repeater, although the Project 25 standard also includes a mode called "talk around" according to which mobile devices can communicate directly without requiring the mediation of a network infrastructure.

Finally, the MPT1327 standard is a communication standard for industrial PMR systems. In addition to mobile devices, it also requires the presence of a system controller (trunking system controller) and a network infrastructure. In more detail, PMR systems compliant with the MPT 1327 standard comprise multiple radio channels, one of which is defined as a control channel (CC), whereas the remaining channels are defined as traffic channels (TC). Communications between mobile devices and network infrastructure take place over the control channel, while communications between mobile devices take place over traffic channels, thus allowing for both point-to-point calls and group calls.

The above-mentioned communication standards provide group communications over large geographical areas, but they offer no support for localizing the mobile devices, nor they allow for digital communications at high bit rates.

In order to overcome these drawbacks, and in particular to increase the speed of transmission of digital data, enhanced communication systems have been proposed which integrate mobile devices of the aforementioned type together with broadband devices, i.e. devices capable of providing digital communications at high bit rates, e.g. devices supporting the Wireless Local Area Network (WLAN) technologies.

So-called Mobile Ad-Hoc Networks (MANET) have also been developed, which are networks of mobile devices, commonly referred to as nodes, that implement a coordination algorithm in a distributed or centralized manner so as to carry out those functions traditionally performed by a network infrastructure, e.g. data routing. Said networks of mobile devices can also operate in the absence of any external infrastructure, but they provide no information to the users about the position of the other users, and therefore they do not provide mutual localization of the mobile devices, thus being unsuitable for professional use, which requires a prompt localization of users possibly in trouble.

On the other hand, mobile radio communication devices are known which comprise localization apparatuses such as, for example, the Global Positioning System (GPS) or simpler Radio Frequency Identifier (RFID) labels. Mobile radio communication devices are also known which are integrated into GSM (Global System for Mobile communications) systems, and which allow to estimate the position of a cellular telephone based on the identifier of the cell in which the cellular telephone is located.

For example, patent application U.S. Pat. No. 6,373,430 describes a portable GPS/radio unit communicating through a wireless network with at least one second unit which sends radio signals indicating its own position. The GPS/radio unit comprises a GPS receiver configured for receiving satellite signals from a plurality of satellites, a radio receiver configured for receiving radio signals sent by the second unit, a processor configured for calculating the position of the unit depending on the incoming satellite signals and for identifying the position of the second unit on the basis of the incoming radio signals, and a screen configured for showing the position of the second unit.

Similarly, patent application EP1162474 describes a portable apparatus comprising a GPS-type positioning device capable of communicating its own current position to another portable apparatus. The apparatus also comprises a device adapted to acquire a geographical map and a screen adapted to show the current position of another portable apparatus with reference to said geographical map.

Instead, patent application EP1576386 describes a cartographic localization device fitted with a screen, a keyboard, wireless communication means and GPS localization means. Known mobile devices, also including therefore the devices described in EP1576386, EP1162474 and U.S. Pat. No. 6,373,430, as well as the corresponding systems consisting of mobile devices and a network infrastructure, suffer from several drawbacks. In particular, in the case of mobile devices using the GPS system, localization is very accurate due to the utilization of GPS receivers, which however require adequate visibility of the sky vault in order to be able to receive and correlate the signals coming from the satellite constellation. Vice versa, in the case of low-cost mobile devices using RFID labels, localization is only possible over small areas, since RFID labels draw little power and the emitted signals cannot reach distances longer than a few meters. Finally, localization systems based on GSM networks are often affected by considerable inaccuracy, which makes them unsuitable for professional use; furthermore, they can only be implemented by telephone companies, since the mapping of the cells of a GSM network is not of public knowledge.

Also, the mobile devices known in the art can only determine their own and other mobile devices' geographical positions in the presence of a localization system, whether satellite or terrestrial type. For this reason, communication and localization systems comprising mobile devices like those described above are not generally suitable for use within closed spaces or where there is no network coverage. Moreover, the close dependence of the systems described above on the presence of network coverage makes them unsuitable for use in emergency situations, wherein no service provision uncertainty due to possible network coverage interruptions is admissible.

It is the object of the present invention to provide a mobile communication and localization device which at least partly overcomes the drawbacks of the prior art.

The present invention discloses a mobile communication and localization device as set out in claim 1.

BRIEF DESCRIPTION OF THE DRAWINGS

For a better understanding of the invention, a number of embodiments thereof will now be described by way of non-limiting example with reference to the annexed drawings, wherein:

FIG. 3 shows an example of a data structure according to an embodiment of the present invention;

DETAILED DESCRIPTION OF THE PREFERRED EMBODIMENTS

Figure 1:
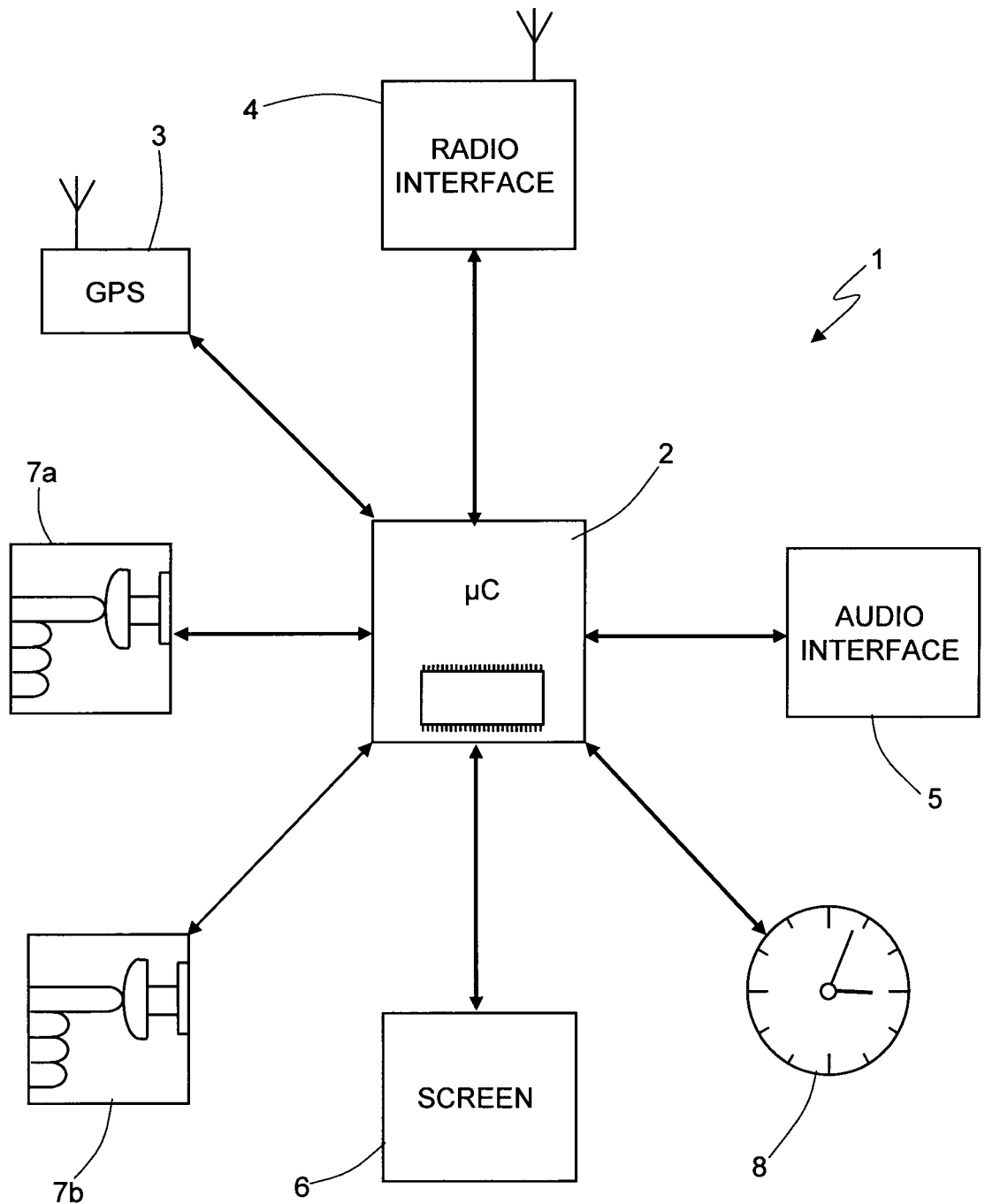
FIG. 1 is a block diagram of a mobile communication and localization device according to an embodiment of the present invention.

FIG. 1 shows a mobile communication and localization device, hereafter referred to as mobile device 1, comprising a microcontroller unit 2 to which the following peripheral devices are connected: a GPS receiver 3; a short-range radio interface 4 compliant with the IEEE 802.15.4 standard, preferably operating within the 2.4 GHz Industrial, Scientific and Medical (ISM) band; an audio interface 5, typically comprising a headset and a microphone (not shown in FIG. 1); a screen 6; a PTT push-button 7a; an emergency push-button 7b, and a local clock 8.

Microcontroller unit 2 is set up to support, among other things, the following functionalities in cooperation with the peripheral devices: creating groups of mobile devices, tracking mobile devices, handling group calls, signalling emergency situations, and encrypting communications.

In particular, groups of mobile devices can be created by assigning a unique identifier to each mobile device. From a practical viewpoint, an identifier can be assigned to mobile device 1 by using an external programming device, e.g. a computer executing configuration software adapted to load said identifier into microcontroller unit 2. This allocation may take place according to known techniques, and will not therefore be described any further.

The tracking of the mobile devices is accomplished through a tracking algorithm executed by microcontroller unit 2, which algorithm will now be described with reference to the example of FIG. 2, which shows a group 100 of eight mobile devices 1, designated for clarity by reference numerals 10-80. Given group 100 of mobile devices 10-80, the tracking algorithm allows each mobile device 10-80 to determine the relative position of other mobile devices 10-80.

Figure 2:
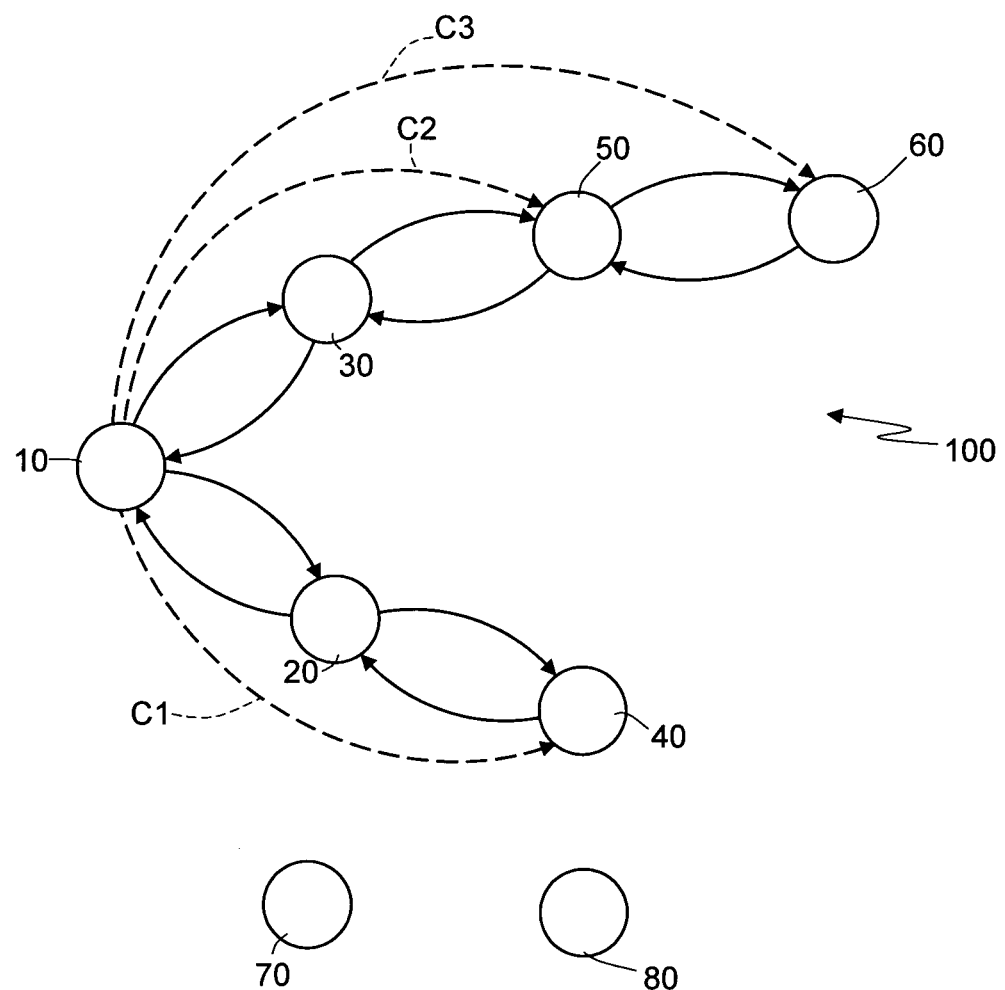
FIG. 2 shows an example of a connection scheme among a plurality of mobile communication and localization devices.
Figure 5:
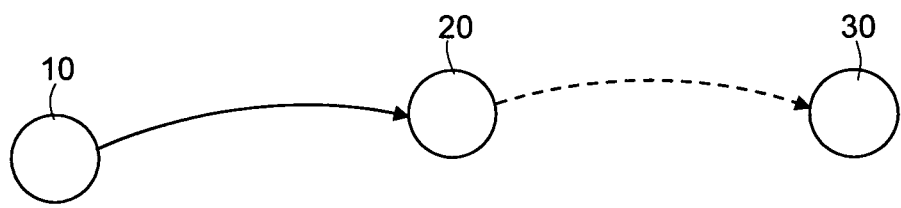
FIG. 5 shows an example of a data transmission sequence among mobile communication and localization devices.

FIG. 2 shows how the mobile device 10 implements the tracking algorithm, said algorithm being implemented in the same manner also by the remaining mobile devices 20-80.

According to the tracking algorithm, mobile device 10 stores within microcontroller unit 2 a data structure containing information about other mobile devices 20-80. In particular, the data structure contains one entry for each mobile device 20-80 known to mobile device 10, i.e., in the illustrated example, mobile devices 20-80 that mobile device 10 has information about. Each entry contains information about the corresponding mobile device. Furthermore, mobile device 10 classifies the known mobile devices, which in this example are assumed to be all of mobile devices 20-80, into three categories:
- a first category, comprising mobile devices 20 and 30 which can be reached directly by mobile device 10, i.e. which can exchange electromagnetic signals with mobile device 10 and therefore can communicate directly therewith;
- a second category, comprising mobile devices 40, 50 and 60 which can be reached indirectly by mobile device 10 through the mediation of intermediate mobile devices, which are so arranged in space as to form corresponding paths C1, C2 and C3 between mobile device 10 and mobile devices 40, 50 and 60 taken into account, wherein each path C1, C2, C3 is formed by a succession of intermediate mobile devices (mobile device 20, the mobile device 30 and mobile devices 30 and 50, respectively), each intermediate mobile device being able to communicate directly with the previous mobile device and with the next mobile device within said succession;
- a third category, comprising mobile devices 70 and 80 which cannot be reached by mobile device 10 either directly or indirectly, i.e. which cannot communicate with it, but are known on the basis of previous information, as will be described more in detail below. The information contained in each entry depends on the category the corresponding mobile device 20-80 belongs to. Some pieces of information are however available in every entry, such as: the identifier of the corresponding mobile device 20-80; the alarm status indication; the latest estimated absolute position of the corresponding mobile device, if available; and a time stamp, the meaning of which will be explained later on.

For a mobile device belonging to the first category (mobile devices 20 and 30), the entry also contains an estimate of the relative distance of mobile device 20, 30 from mobile device 10.

For a mobile device belonging to the second category (mobile devices 40, 50 and 60), the entry contains the shortest path length, said length being expressed as the number of intermediate mobile devices making up the shortest path.

For a mobile device belonging to the third category (mobile devices 70 and 80), no further information is available.

FIG. 3 shows a qualitative example of a possible implementation of the described data structure by mobile device 10, with reference to the connection scheme shown in FIG. 2.

In order to localize mobile devices 20-80 and send the information contained in its own data structure to said mobile devices 20-80, mobile device 10 periodically emits data packets, e.g. with a period of approximately one second. Said data packets or, more precisely, the electromagnetic signals corresponding thereto, are emitted with cyclically different emission power $P_e$.

Each data packet contains the following data:
- an identifier of mobile device 10;
- the emission power $P_e$ at which it has been emitted, expressed as discrete power levels;
- if available, the latest estimated absolute position of mobile device 10, obtained through any known localization technique, typically by using GPS receiver 3 of the device itself;
- an indication of the alarm status into which mobile device 10 may have been set by the user by pressing emergency push-button 7b.

In addition to the above information, the data packet also contains additional information pertaining to the mobile devices resulting from the above-described data structure.

In the case of mobile devices 20, 30, which can reach mobile device 10 directly, the above-mentioned additional information comprises, for each one of mobile devices 20, 30 taken into account:
- the latest estimated distance between mobile device 10 and mobile device 20, 30 taken into account;
- the time interval elapsed between the instant when the estimate was calculated and the instant of transmission of the data packet;
- if available, the absolute position of mobile device 20, 30 taken into account; and
- an indication about the possible alarm status of mobile device 20, 30 taken into account.

In the case of mobile devices 40, 50, 60, which can reach mobile device 10 indirectly, the above-mentioned additional information comprises, for each of them:
- the length of the latest shortest path between mobile device 10 and mobile device 40-60 taken into account;
- the time interval elapsed between the instant at which the indirectly reachable mobile device 40-60 sent the data packet used by the first intermediate mobile device in order to create the corresponding entry in its own data structure and the instant of transmission of the data packet by mobile device 10;
- if available, the absolute position of mobile device 40-60 taken into account; and
- an indication about the possible alarm status of mobile device 40-60 taken into account.

Finally, in the case of mobile devices 70, 80, which cannot be reached either directly or indirectly, the aforementioned additional information comprises, for each of them:
- an indication about the unreachable condition of mobile device 70, 80 taken into account;
- the time interval elapsed from the instant at which mobile device 10 received the last data packet containing at least one piece of information about mobile device 70, 80 taken into account; and
- if available, the last absolute position of mobile device 70, 80 taken into account, known to mobile device 10.

Mobile device 10 periodically transmits data packets of the type described above. When directly reachable mobile devices (hereafter also referred to as sender mobile devices; in the example of FIG. 2, mobile devices 20 and 30) receive such packets, they will update their own data structures based on the packet contents, as will be described below. Thus, mobile devices 10-80 belonging to group 100 will broadcast information about their spatial position, cooperating with one another in a manner such that each mobile device 10-80 will know the position of other mobile devices 10-80.

Still with reference to FIG. 2, the following will describe the data structure update procedure carried out by mobile devices 10-80 when they receive a data packet. For simplicity, the following description will refer to the update procedure carried out by mobile device 20, this same procedure will also be carried out by remaining mobile devices 10, 30-80. Furthermore, it will also be assumed that the data packet received by mobile device 20 was sent by mobile device 10, and that it contains information about mobile devices 30 and 50, in particular information about the facts that mobile device 10 can be reached directly by mobile device 30 and that mobile device 10 can be reached indirectly by mobile device 50 through a path comprising one intermediate unit, namely mobile device 30. It will also be assumed that the data packet is emitted by mobile device 10 with an emission power $P_e$ and is received by mobile device 20 with a reception power $P_r$.

Figure 4:
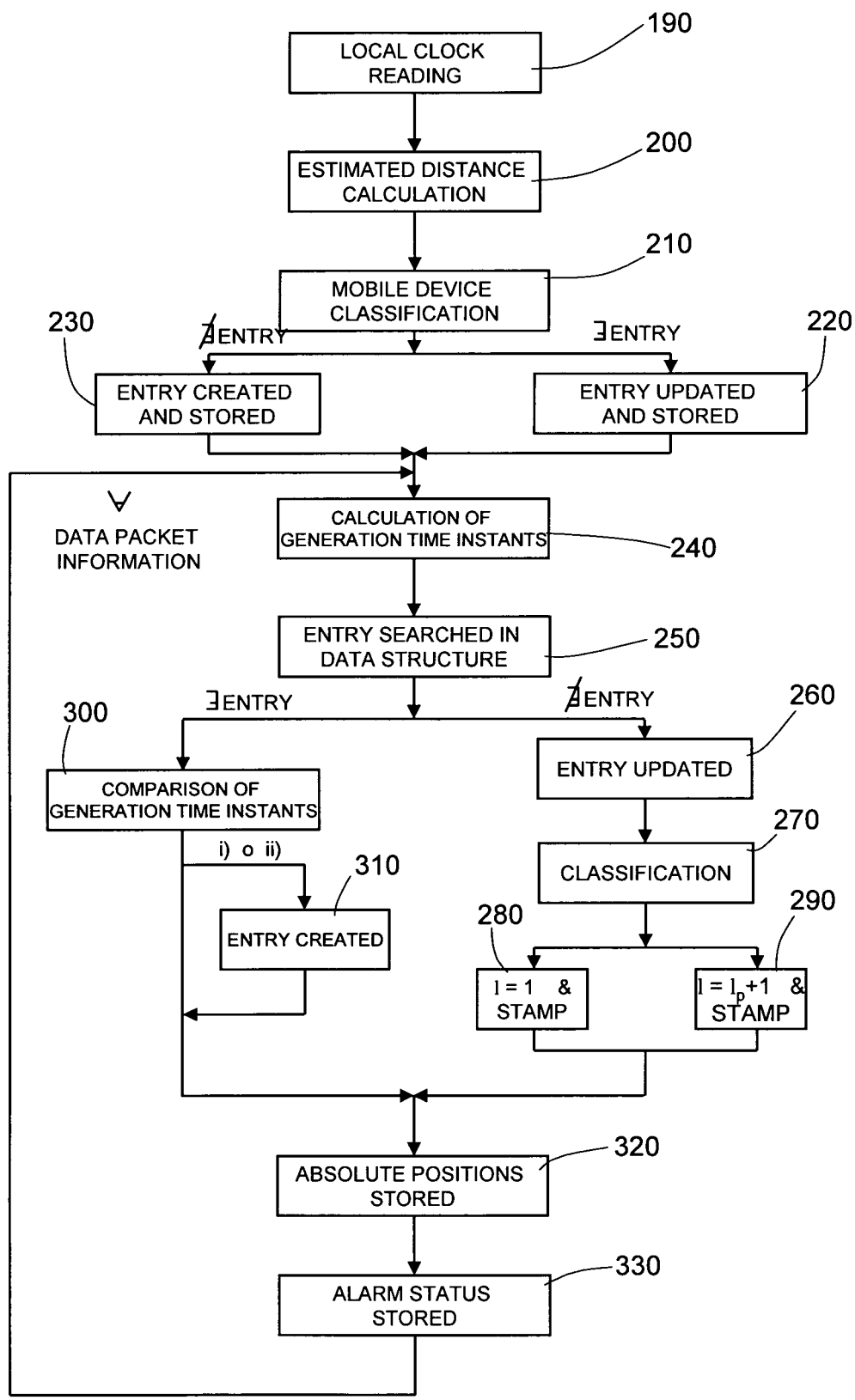
FIG. 4 is an exemplifying flow chart of the steps carried out by a mobile communication and localization device according to an embodiment of the present invention when it receives a data packet.

As shown in FIG. 4, after having received the data packet at a certain reception instant, mobile device 20 identifies mobile device 10 from the identifier contained in the data packet and updates its own data structure with the following steps:

- by using its own local clock 8, it calculates (block 190) the time instant of reception of the data packet;
- through known techniques not described herein, it calculates (block 200) the estimated distance between itself and mobile device 10 based on a power attenuation AP equal to the difference between the emission power $P_e$, stated in the data packet, and the reception power $P_r$, determined by mobile device 20;
- it classifies (block 210) mobile device 10 as directly reachable;
- it stores (blocks 220, 230) the estimated distance between itself and mobile device 10 into a corresponding entry of its own data structure, either by updating the previous entry (block 220) or by creating a new entry (block 230), and enters a time stamp into said (new or updated) entry indicating the time instant of reception of the data packet;
- on the basis of the information about mobile devices 30 and 50 contained in the data packet, it calculates the generation time instants (block 240), i.e. the time instants which said information refers to, by subtracting from the packet reception instant the respective time intervals contained in the data packet itself, which indicate the time elapsed between the transmission of the packet and the generation of said information;
- for each mobile device 30, 50 for which information is contained in the data packet, it verifies (block 250) the presence of a corresponding entry in its own data structure and:
- if there is no matching entry, then it will create one (block 260), classify (block 270) mobile device 30, 50 taken into account as indirectly reachable, and enter (blocks 280, 290) the information about the path length (1 in FIG. 4) and the previously calculated generation time instant. The path length information depends on the type of mobile device 30, 50 taken into consideration: for mobile device 30, the information about the shortest path length will be set to one (block 280); for mobile device 50, the information about the shortest path will be set to two by increasing the value stated in the packet (block 290), referred to as $l_p$ in FIG. 4, by one unit;
- vice versa, if a matching entry already exists, then it will compare (block 300) the generation time instant with the time stamp contained in the entry, and it will subsequently update (block 310) the entry only in the following cases:
  i) if the generation time instant is subsequent to the time stamp contained in the entry; or
  ii) if the generation time instant matches the time stamp, and ii.a), for a mobile device 30 which can be reached directly by mobile device 10, if the corresponding entry states that mobile device 30 was previously indirectly reachable through a shortest path longer than one, or 11.b), for a mobile device 50 which can be reached indirectly by mobile device 10, if the shortest path length stated in the data packet increased by one unit is shorter than the shortest path length stored in the corresponding entry;

- it stores (block 320) the information about the absolute positions of both mobile device 10 and the mobile devices 30-80, if available;
- it stores (block 330) the information about any mobile devices in alarm status.

Should mobile device 20 receive no data packets containing information about a mobile device 10, 30-80 for longer than a certain threshold, mobile device 20 will update the corresponding entry in its own data structure by classifying such mobile device 10, 30-80 as unreachable.

In other words, the time stamp of each entry of the data structure indicates the time instant which the corresponding information refers to, calculated with respect to the local clock. In fact, for a directly reachable mobile device, the time stamp indicates the instant of reception of the data packet. Vice versa, for an indirectly reachable mobile device, the time stamp indicates the instant at which the first device of the shortest path received from the mobile device taken into account the data packet used for determining the information to be subsequently propagated along the shortest path, i.e., assuming negligible propagation times, the instant of transmission by the mobile device taken into account.

By way of example, FIG. 3 shows three mobile devices 10, 20, 30, each mobile device 10, 20, 30 having initially no information about the position of the other devices. It is also assumed that mobile devices 10, 20, 30 are so configured as to calculate the estimated distance between them and a sender mobile device as soon as they receive a data packet, and that data packet propagation times are negligible.

Supposing that at time t0 mobile device 10 sends (continuous line) a first data packet which is received by mobile device 20 only, mobile device 20 then updates its own data structure based on said first data packet by entering an entry relating to mobile device 10 and associating the estimated distance therewith; the time stamp associated with said entry will therefore be the instant of reception of said packet, i.e. time t0.

Subsequently, at time t1, mobile device 20 sends (dashed line) a second data packet containing information stating that, at time Δt equal to t1−t0, mobile device 10 was reached directly by mobile device 20. Said second data packet is received by mobile device 30 only, e.g. because mobile device 10 has moved and can no longer be reached by mobile device 20. Based on said second data packet, mobile device 30 updates its own data structure by creating an entry for mobile device 20 comprising the estimated distance between itself and mobile device 20, as well as a time stamp equal to time t1', i.e. the instant of reception of the data packet as determined with reference to its own local clock. In other words, time t1' is the representation of time t1 according to the local clock of mobile device 30. In addition, mobile device 30 also creates an entry for mobile device 10, wherein it stores an indirect connection and sets a shortest path of 1 and a time stamp corresponding to time t0'=t1'−Δt. This spares the need of synchronizing the local clocks of the mobile devices, while still preserving a correct event succession in every mobile device.

The implementation of the above-described tracking algorithm allows mobile devices 10-80 to obtain information about the positions of other mobile devices 10-80, the communication among mobile devices 10-80 being possible through known techniques by using radio interfaces 4 and, for audio communications, audio interfaces 5, all cooperating with respective microcontroller units 2.

When mobile device 10 is operating normally, the information about the (absolute or relative) position of other mobile devices 10-80 is displayed on screen 6. If the received data packet contains an indication pertaining to an alarm status of a mobile device, microprocessor unit 2 will control audio interface 5 and/or screen 6 so as to generate an acoustic and/or visual warning. Microprocessor unit 2 may be so configured as to interrupt said warning signal after a predetermined time limit has been exceeded. Likewise, microprocessor unit 2 may advantageously be so configured as to generate said signal also when it detects the presence of any mobile devices classified as unreachable.

As far as group call management is concerned, mobile devices of the above-described type share a communication channel, i.e. they communicate with one another by using the same frequency band, so that they can also exchange data (e.g. audio data) in addition to monitoring one another. Furthermore, by sharing the communication channel each mobile device can broadcast information, e.g. voice information generated through built-in audio interface 5, to all the other mobile devices according to a point-multipoint call scheme.

Said broadcast transmission is initiated by the user by pressing PTT push-button 7a and is dependent on the possibility of accessing the communication channel, i.e. the actual band availability. In fact, since the shared communication channel has by definition a limited band, the access to the communication channel by the single mobile devices is arbitrated in accordance with an arbitration algorithm.

By way of example, an arbitration algorithm may be used according to which the mobile devices access the communication channel one at a time in a predetermined order, said mobile devices having been assigned different priority levels. Still by way of example, the arbitration algorithm may change said order dynamically by granting high priority to mobile devices in emergency status, thus allowing for quick warnings when needed. In the event that there are several devices in emergency status, the access to the communication channel will be handled for such devices in accordance with the predetermined order, i.e. as if such devices were not in alarm status, so that the access to the communication channel will reflect the predetermined priority levels.

For security reasons, the communications among the mobile devices may be encrypted by using known encryption techniques, which will not be described herein.

Within a system comprising a plurality of mobile devices as previously described, each mobile device communicates with the other mobile devices in order to cooperatively generate information about the composition of the system itself and the position of the mobile devices, even in the absence of a fixed infrastructure. Besides, the equal (i.e. not hierarchical) nature of the described mobile devices makes the above-mentioned system resilient against any malfunction of single mobile devices.

It is finally apparent that the communication and localization device 1 described herein may be subject to changes and variations without departing from the scope of the present invention as set out in the appended claims. In particular, GPS receiver 3 may be replaced with a different localization system, e.g. a Galileo system. Likewise, emergency push-button 7b may be replaced with another functionally equivalent emergency signalling device, e.g. a voice recognition device. Furthermore, according to a particular embodiment PTT push-button 7a and audio interface 5 may be omitted, said embodiment of mobile device 1 only allowing the user to notify the emergency status. Finally, screen 6 may be omitted as well.

The invention claimed is:

1. A mobile communication and localization device configured for cooperating with a plurality of mobile network devices, the device comprising:
   a processing unit;
   a data structure adapted to contain a plurality of entries, each entry containing information about a mobile network device belonging to said plurality of mobile network devices and a corresponding time stamp;
   means for sending data packets at successive instants of transmission to the plurality of mobile network devices, each data packet containing position data indicating positions of said mobile network devices;
   means for receiving data packets sent by said mobile network devices belonging to said plurality of mobile network devices, wherein information in the received data packet is incorporated into the entries in the data structure;
   means for managing the information contained in said data structure with a local clock, and managing the information contained in each said data packet with a time interval elapsed between the time instant represented by the time stamp associated with a pertaining piece of information, as stored in said data structure of said sending mobile network device, and the instant of transmission of said data packet, according to the local clock of said sending mobile network device;
   means for determining, based on said position data contained in said data packets, the relative positions of said mobile network devices and further wherein said data packets comprise indications of an alarm status of at least one other mobile network device belonging to the plurality of mobile network devices; and
   means for signaling an alarm status,
   wherein said processing unit comprises means for calculating estimated distances from said mobile network devices, said estimated distances being calculated at successive calculation instants,
   wherein said data structure is configured in a manner such that said information about a corresponding mobile network device contained in each entry comprises:
      the estimated distance from said mobile network device, the time stamp associated thereto indicating the instant of reception of the data packet containing the power data used for calculating said estimated distance;
      a shortest path length, in the case of a first mobile network device belonging to a succession of mobile network devices and indirectly reachable through said succession, wherein the time stamp associated to said information indicating an instant of generation of a data packet by said first mobile network device
   wherein said means for determining said relative position of said mobile network devices comprise:
      means for determining the instant of reception of each data packet;
      means for calculating, for each mobile network device identified by a position data contained in said data packet, a time stamp equal to the difference between the instant of reception and the time stamp associated to said position data;
      means for verifying if said data structure comprises an entry pertaining to said identified mobile network device;
      means for generating a new entry, which are activated in the event that there is no entry for said identified mobile network device, and which associate the shortest path length increased by one unit and said time stamp with said identified mobile network device; and
      means for comparing the calculated time stamp with a stored time stamp, which are activated in the event that said entry for said identified mobile network device already exists and contains said stored time stamp, and for updating said entry if said calculated time stamp is subsequent to said stored time stamp, and wherein said comparing means will also update said entry if said calculated time stamp matches said stored time stamp and said data packet indicates a shortest path which is shorter than the shortest path length contained in said entry.

2. The mobile communication and localization device according to claim 1, wherein each data packet contains a power datum indicating its emission power ($P_e$), and said estimated distances are calculated based on the power data contained in said data packets.

3. The mobile communication and localization device according to claim 2, wherein said estimated distances are calculated by determining the reception power ($P_r$) associated with a received data packet and by calculating a power attenuation ($\Delta P$) equal to the difference between said emission power ($P_e$) and said reception power ($P_r$).

4. The mobile communication and localization device according to claim 1, wherein each data packet further comprises a time stamp for each position data, and wherein each position data comprises:

the estimated distance from a mobile network device, if directly reachable, wherein the time stamp associated to said position data indicates the time elapsed between the instant of reception of the data packet containing the power data used for calculating said estimated distance and the instant of transmission of said data packet;

a shortest path length, in the case of a first mobile network device belonging to a succession of mobile network devices and indirectly reachable through said succession, wherein the time stamp associated to said position data indicates the time elapsed between said instant of generation and said instant of transmission.

5. The mobile communication and localization device according to claim 1, further comprising localization means adapted to estimate the absolute position of the mobile communication and localization device itself, and said data packets comprise estimated absolute positions of corresponding mobile network devices.

6. The mobile communication and localization device according to claim 1, further comprising means for displaying the position of said mobile network devices.

7. A mobile communication system comprising a plurality of mobile communication and localization devices according to claim 1.

8. A mobile communication system comprising a plurality of mobile communication and localization devices according to claim 1, wherein said mobile communication and localization devices gain access to said communication channel in accordance with an arbitration algorithm.

9. The mobile communication system according to claim 8, wherein said arbitration algorithm assigns different priority levels to said mobile communication and localization devices depending on whether said mobile communication and localization devices are in alarm status or not.

10. The mobile communication and localization device according to claim 2, wherein said data structure is configured in a manner such that said information about a corresponding mobile network device contained in each entry comprises:

the estimated distance from said mobile network device, the time stamp associated thereto indicating the instant of reception of the data packet containing the power data used for calculating said estimated distance;

a shortest path length, in the case of a first mobile network device belonging to a succession of mobile network devices and indirectly reachable through said succession, wherein the time stamp associated to said information indicating an instant of generation of a data packet by said first mobile network device.

11. The mobile communication and localization device according to claim 4, wherein said means for determining said relative position of said mobile network devices comprise:

means for determining the instant of reception of each data packet;

means for calculating, for each mobile network device identified by a position data contained in said data packet, a time stamp equal to the difference between the instant of reception and the time stamp associated to said position data;

means for verifying if said data structure comprises an entry pertaining to said identified mobile network device;

means for generating a new entry, which are activated in the event that there is no entry for said identified mobile network device, and which associate the shortest path length increased by one unit and said time stamp with said identified mobile network device;

means for comparing the calculated time stamp with a stored time stamp, which are activated in the event that said entry for said identified mobile network device already exists and contains said stored time stamp, and for updating said entry if said calculated time stamp is subsequent to said stored time stamp.

* * * * *